United States Patent
Townsend et al.

(10) Patent No.: US 7,764,958 B2
(45) Date of Patent: Jul. 27, 2010

(54) WIRELESS SENSOR SYSTEM

(75) Inventors: Christopher P Townsend, Shelburne, VT (US); Jacob H. Galbreath, Burlington, VT (US); Justin R. Bessette, Essex Junction, VT (US); Steven W. Arms, Williston, VT (US)

(73) Assignee: MicroStrain, Inc., Williston, VT (US)

( * ) Notice: Subject to any disclaimer, the term of this patent is extended or adjusted under 35 U.S.C. 154(b) by 1385 days.

(21) Appl. No.: 11/084,541

(22) Filed: Mar. 18, 2005

(65) Prior Publication Data

US 2005/0210340 A1    Sep. 22, 2005

Related U.S. Application Data

(60) Provisional application No. 60/554,297, filed on Mar. 18, 2004.

(51) Int. Cl.
    *G06F 11/00*    (2006.01)
(52) U.S. Cl. .................................. 455/423; 455/517
(58) Field of Classification Search ................. 455/423, 455/517; 348/207.99, 222.1, 500, 642; 714/701
    See application file for complete search history.

(56) References Cited

U.S. PATENT DOCUMENTS 6,529,127 B2    3/2003    Townsend

| | | | |
|---|---|---|---|
| 2002/0045459 A1* | 4/2002 | Morikawa | 455/517 |
| 2002/0045836 A1* | 4/2002 | Alkawwas | 600/509 |
| 2003/0105403 A1 | 6/2003 | Istvan | |
| 2004/0017478 A1* | 1/2004 | Cooper et al. | 348/207.99 |

OTHER PUBLICATIONS

Linear Technology specification, LTC4150.
Chipcon specification, SmartRF CC2420.
S.W.Arms, et al, Frequency Agile Wireless Sensor Networks, Smart Structures and Materials 2004.
Peter L Fuhr, A Review of Frequencies Available for Wireless Sensing Applications, Sensor Technology and Design Magazine, Mar. 2002.
Binsfeld Engineering Inc. specification, TorqueTrak 9000.
Eric Hewitt, et al, Use Forward Error Correction To Improve Data Communications (Technolog Information)(Tutorial), Electronic Design Magazine, Aug. 21, 2000.

* cited by examiner

*Primary Examiner*—Sam Bhattacharya
(74) *Attorney, Agent, or Firm*—James Marc Leas

(57) ABSTRACT

A network of wireless sensor nodes for wireless transmission to a base station is provided. The sensor nodes can provide real time streaming of data over separate frequency links that can all be received by the base station. The base station includes a receiver for receiving at multiple frequencies, error detection or correction, and analog outputs so sensor data can be provided to standard analysis systems that require analog signals as would be provided by wired sensors. The base station also provides an output indicating the presence of transmission error.

53 Claims, 12 Drawing Sheets

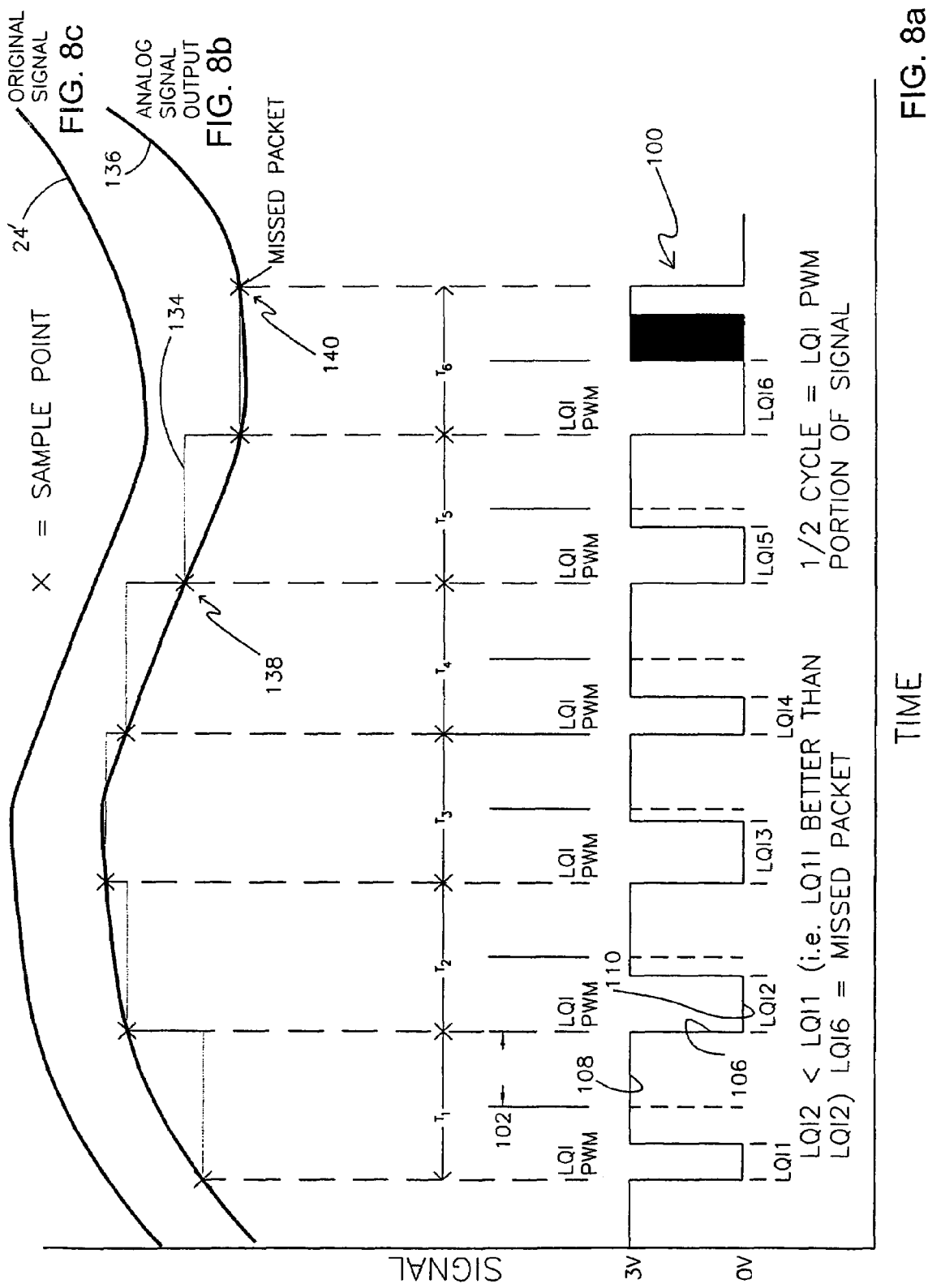

TRANSFER FUNCTION $$\text{Laplace Transform}\left[\frac{V_{out}(t)}{V_{in}(t)}\right] = \frac{k/(R1*Cx*R2*Cy)}{s^2+s(1/R1*Cx+1/R2/Cx+1/R2*Cy-k/R2*Cx)+1/R1*CxR2*Cy}$$

Channelized Wireless Data Acquisition System Phase IIB Target Specifications:

| Number of Wireless Channels | 51 channels at 76.8 kbps via Frequency Division Multiple Access (FDMA) |
|---|---|
| Aggregate Network Streaming Capacity | ~ half a million samples per second w/ 51 SPCM channels |
| End-to-End System Latency | < 2 ms (bounded) for all sampling rates above 1920 sps; delay measured from remote node A/D input to final base station D/A output |
| Base Station Transceiver Card Capacity | 16 transceiver cards per base station |
| Transceiver Card Analog Output | 4 analog output channels connected to base station backplane |
| Base Station Analog Output | 64 BNC connectors and an optional 72-pin ribbon connector |
| Remote Node Specifications: | |
| Operating Temperature: | -40 to +85 deg Celsius |
| Remote Battery Voltage: | 3.6 volt lithium ion ½ AA size internal battery, 950 milliamp-hour capacity standard; or customer may supply external power from 3.1 to 9 volts |
| Maximum Sample Rate per node | 1920 Samples per second in CASM absolute mode 8640 Samples per second in SPCM differential mode |
| Analog to Digital (A/D) converter: | Successive approximation type, 12 bits standard |
| Number Input Channels: | 4 full differential (Wheatstone bridge) inputs to instrumentation amplifier (90 dB CMRR minimum, 0-3 volts common mode maximum), and 4 single ended inputs (0-3 volts maximum) |
| Constant DC Bridge Excitation: | +3 volts DC at 50 milliamps maximum (applies to sweep rates above 256 Hz only) |
| Programmable Gain: | for differential input channels 1-4, user programmable from 2 to 3000 |
| Programmable Offset: | user programmable, maximum allowable input offset is 600 millivolts |
| Radio Frequency Carrier: | 902-928 MHz standard |
| RF Programming & Downloading: | 76800 baud, wireless RF, pulse code modulated, FSK |
| Range for Bi-Directional RF link: | 1/3 mile line-of-sight |

FIG. 11

WIRELESS SENSOR SYSTEM

PRIORITY

This application claims priority of provisional patent application 60/554,297, filed Mar. 18, 2004.

FIELD

This patent application generally relates to collecting and transmitting data. More particularly, it relates to a system for sensing, transmitting, and receiving data. Even more particularly, it relates to a system having analog sensors and digital wireless transmission of sensor data.

BACKGROUND

Wireless sensor networks have advantage over wired connection because the cost of running wire for a sensor can be as high as 50% to 90% of the cost of the sensor. Thus, substantial advantage can be achieved by using integrated wireless sensing solutions, such as G-Link, which includes wireless accelerometers, SG-Link, which includes wireless strain gauges, and TC Link, which includes wireless thermocouples, all available from MicroStrain, Inc. Williston, Vt. These systems include surface acoustic wave (SAW) resonator RF links as well as wireless transceiver chipsets to produce low power, high speed datalogging transceiver systems with integrated signal conditioning and integrated micro-electromechanical systems (MEMS) sensors. However, since these RF communications systems operate on a narrowband frequency, several of them have not been able to communicate simultaneously without interfering with each other. MicroStrain overcame this problem by storing data locally in addressable dataloggers, which can be commanded by the host base station to simultaneously log data to local memory, as described in issued/copending U.S. patent applications Ser. Nos. 09/731,066, and 10/379,224, incorporated herein by reference. In that scheme, each of the systems can be polled sequentially and their stored data downloaded individually to a base station including a personal computer.

However, substantial delay is introduced in the base station receiving the information by this datalogging and later transmission scheme. In some applications wireless sensors can stream data continuously to a base station over a single radio frequency channel. With multiple sensors on the same channel this streaming must be done sequentially, which makes synchronization of data from these sensors more difficult. Since many applications require that data from multiple sensors be received and analyzed in real time, so that data from various sensors can be correlated, a network of wired sensors that intrinsically provide this capability has been preferred.

A network of wired sensors have also been preferred because many sensor data analysis systems in current use are designed for input with analog voltages as obtained from wires directly connected to the sensors. Wireless networks, such as G-Link (TM Microstrain, Inc., Williston, Vt.), SG Link (TM Microstrain, Inc., Williston, Vt.), and TC Link (TM Microstrain, Inc., Williston, Vt.) have converted data from analog to digital at each sensor location and then transmitted the digital data to a base station.

Many analysis systems have used analog voltage inputs and thus there has been a need for base stations to provide analog output while preserving digital wireless communications from sensors to base station. Thus, a better system is needed that can provide continuous real time sensor data transmission by a plurality of sensor systems in a network and that can provide all this sensor data for input to sensor data analysis systems in analog form while preserving the advantages of digital communication which allows for detection of communication errors and which is inherently robust, and this solution is provided by the following invention.

SUMMARY

One aspect of the present patent application is a measurement system, that includes sensors, a network of wireless sensor nodes, and a base station. The network of wireless sensor nodes, include transmitters configured to transmit digital data derived from the sensors. The base station includes receivers, a processor, digital to analog circuitry, first analog outputs, and second analog outputs. In this embodiment, the receivers are configured to receive the transmissions from the network of wireless sensor nodes and to provide a plurality of received digital signals derived from the transmission. The processor is configured to analyse the received digital signals for detecting an error. The digital to analog circuitry is configured for converting the received digital signals into a plurality of received analog signals. The first analog outputs provide analog signals derived from the received analog signals. The second analog outputs provide signals indicating an error in wireless transmission from each the wireless sensor node to the base station.

BRIEF DESCRIPTION OF THE DRAWINGS

FIG. 8a is a timing diagram illustrating an output of the base station that provides both timing and a measure of signal strength and error rate of radio communications between a sensor node and the base station;

FIG. 8b includes two charts, a staircase chart indicating output of the D/A converter in the base station and a smooth chart indicating output of programmable filters used to smooth that data after the digital signal transmitted by the wireless sensor node has been received and converted to analog in the D/A converter;

FIG. 8c is a chart showing the original analog signal from a sensor in the wireless sensor node for comparison with the chart of FIG. 8b;

FIG. 9a is a block diagram of a programmable digital filter of the present invention for use in the base station shown in FIGS. 1, 2, 5 and 6;

FIG. 9b is the equation of the filter shown in FIG. 9a;

FIG. 11 is a table showing an example of specifications that may be provided for the wireless sensor nodes and base station.

DETAILED DESCRIPTION

The present inventors recognized that substantial advantage is available by wirelessly transmitting sensor data from a network of wireless sensor nodes. They provided a scheme to do so that eliminates problems and substantially improves previous wireless systems. Their scheme provides A/D conversion of analog sensor voltage signals in each wireless sensor node of a network of such wireless sensor nodes. It provides wirelessly transmitting the digitized sensor data from each node in real time and receiving the digital data from the various nodes at a base station. In the base station the received digital data received from each of the sensor nodes is converted back to a set of analog voltage signals. These analog voltage signals are provided at outputs of the base station for use by a sensor analysis or control system. In this way the base station provides analog outputs almost identical to the actual analog voltage signals provided at the sensors, and the system as a whole acts as a virtual wired connection.

By transmitting as digital data, rather than as analog signals, significantly improved data integrity is provided because digital data can be transmitted with much higher fidelity. Transmitting analog data does not easily permit error detection or correction.

Although processing in the analysis and control system is usually accomplished in microprocessors that require digital data, many of these analysis and control systems are designed for wire connection to their sensors. They are therefore designed to accept analog voltage signals from the sensors and have their own A/D conversion. Thus, the present inventors recognized that by converting received digital data at the base station back to an analog signal they could provide a way for users to transmit sensor data wirelessly while avoiding the need to substantially redesign or replace existing analysis or control systems. They could in essence provide a digital wireless equivalent to a wired connection—a virtual wire—for immediate commercial use with existing analysis and control systems that are designed to accept analog signals wired connections to sensors.

Along with the RF transmission of digital data from each node, check sum or error correction data can also be transmitted, allowing the base station receiver to determine the integrity of data transmitted from each node. The base station can include an output for indicating that defective data has been received or that defective data has been corrected. It can also have an output indicating the integrity of data received over time.

Figure 1:
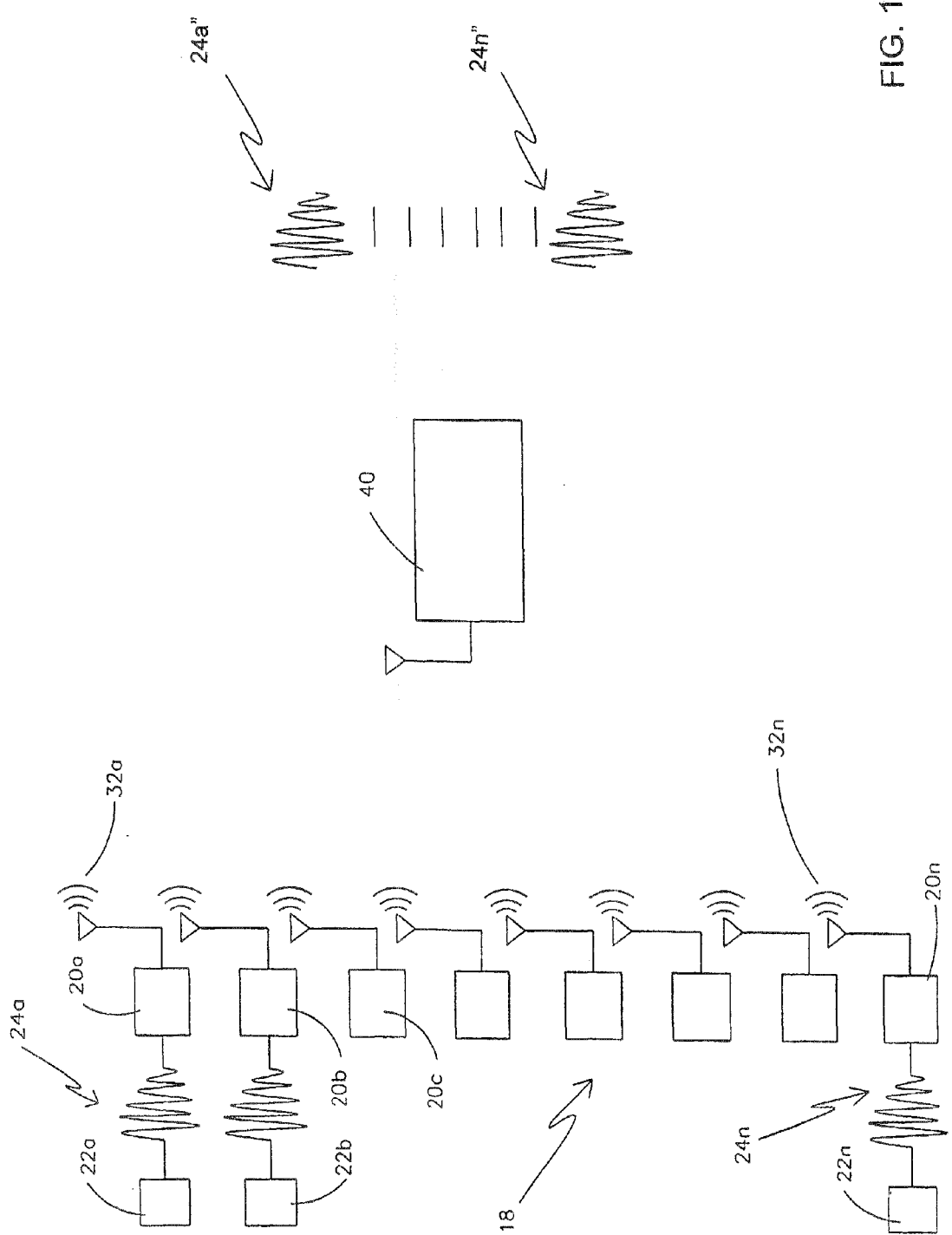
FIG. 1 is a schematic diagram illustrating a network of wireless sensor nodes and a base station of the present invention.
Figure 2:
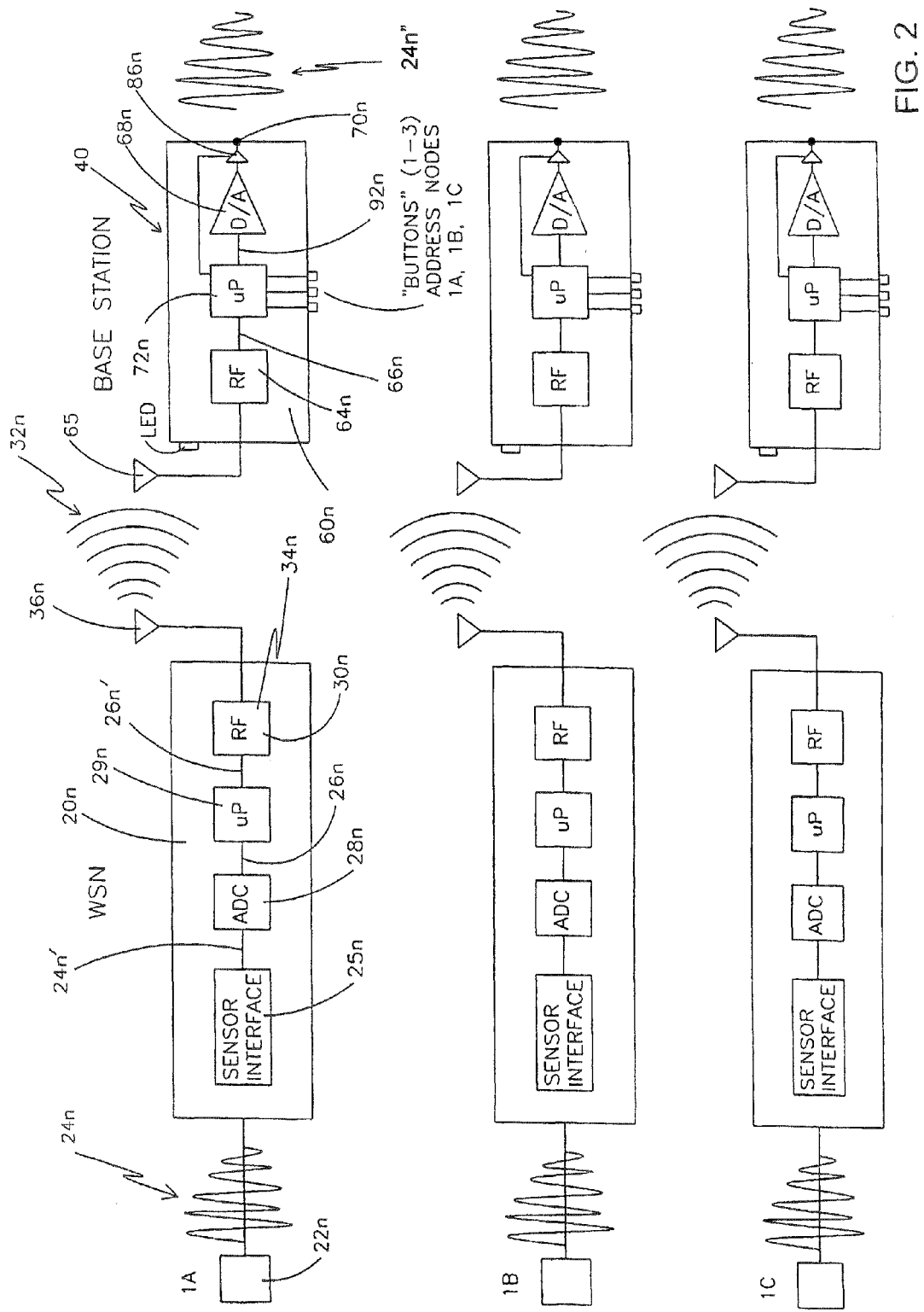
FIG. 2 is a block diagram illustrating wireless sensor nodes transmitting sensor data to base station modules of the present invention.

Network 18 of sensor nodes 20a, 20b, 20c, . . . , collectively represented as sensor nodes 20n, are associated with sensors 22a, 22b, . . . , collectively represented as sensors 22n, as shown in FIG. 1. Sensors 22n detect changes in parameters that may vary over time, as indicated by input signals 24a, . . . , collectively represented as input signals 24n. Sensor nodes 20n process and transmit signals derived from input signals 24n, as shown in FIG. 1. The parameters sensed by sensors 22n may be displacement, acceleration, strain, pressure, temperature, torque, or any other measurable parameter that can be sensed with a sensor. Sensor nodes 20n include sensor conditioning electronics 25n that provide analog voltage signals 24n' of a magnitude that can be converted from analog input signals 24n to digital data streams 26n in analog to digital converters 28n, as shown in FIG. 2. Digital data streams 26n are processed in sensor node microprocessors 29n to provide digital data streams 26n'. Microprocessors 29n manage collection and preparation of digital data 26n for wireless transmission by transmitters 30n.

Management provided by microprocessors 29n can include streaming digital data unchanged. Management can also include data processing, data reduction, data filtering, and providing error correction codes locally within microprocessors 29n before transmission. Data 26n' provided by microprocessors 29n can thus include a real time digital data stream. It can also include a summary of data earlier sampled and stored in memory for such processing. For example, sensor node 20b could sample sensor 22b ten times per second but only transmit the average of this data once every minute. The management of the data within microprocessors 29n is software programmable.

Microprocessors 29n also manage RF transmitters 30n, in one embodiment, setting up transmitter channel frequencies and other digital functions so data streams 26n' from microprocessors 29n can be wirelessly transmitted as digital RF signals 32n over individual digital radio frequency channels 34n by transmitters 30n that each transmit at a different frequency.

Transmitters 30n can also be transceivers so sensor nodes 20n can participate in two way communications, for example, providing data derived from sensors 22n to RF receivers 64n in base station 40 and receiving instructions for programming microprocessors 29n from base station 40 through antennas 36n and 65.

Figure 3:
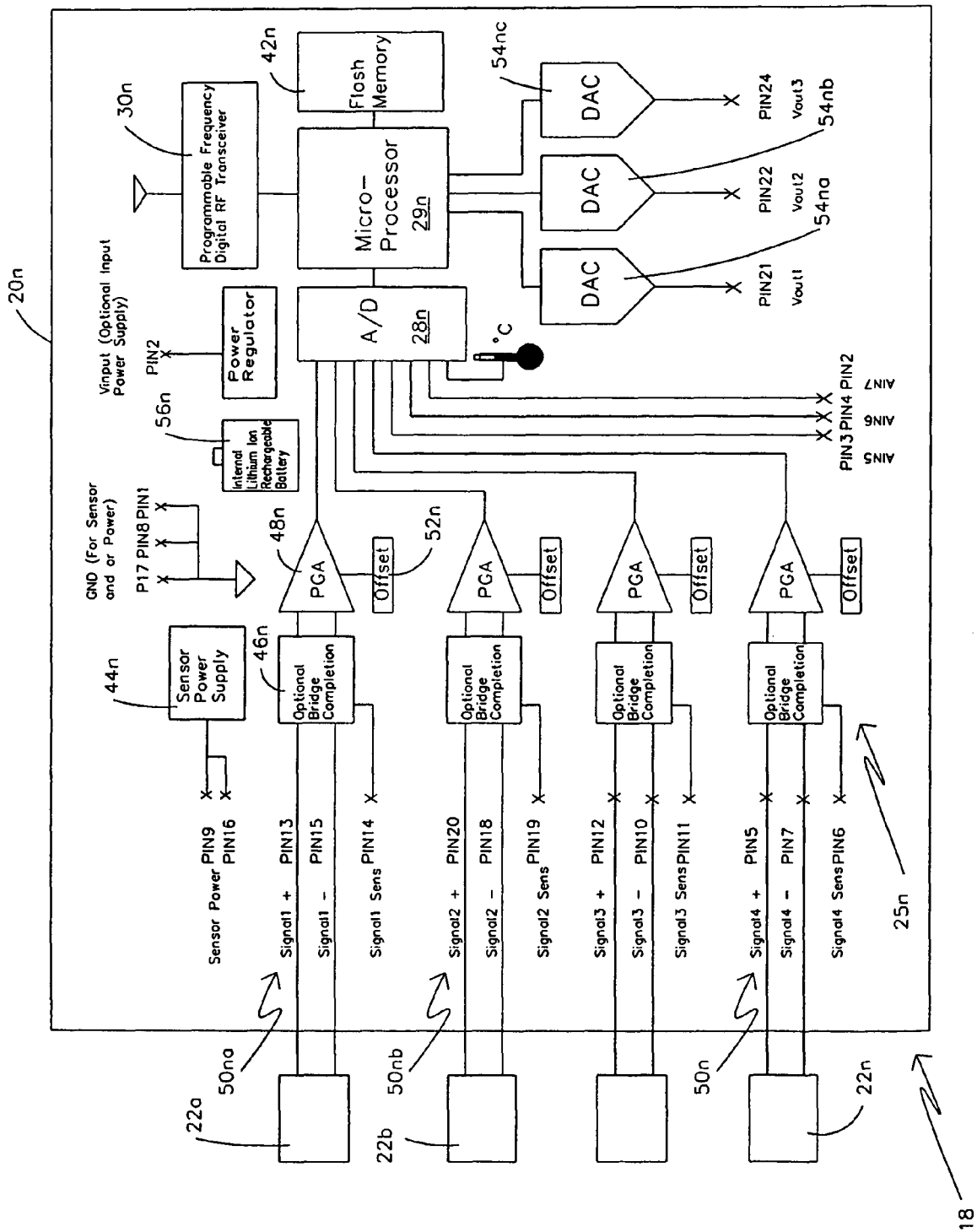
FIG. 3 is more detailed block diagram of the wireless sensor node.

Sensor nodes 20n also include flash memory units 42n connected to microprocessors 29n for storing data, instructions, programs, or calibration information, as shown in FIG. 3.

Each of the sensor nodes 20n also includes sensor power supplies 44n for powering sensor conditioning electronics 25n.

Sensor conditioning electronics 25n can include bridge completion components 46n to which individual sensors 22n can be connected at sensor input pins, as shown in FIG. 3. Sensor conditioning electronics 25n can also include programmable gain amplifiers 48n, set to provide the gain needed so signals 24n from sensors 22n are amplified into signals 24n' that are of a magnitude that can be interpreted by A/D converters 28n.

Four input channels 50na, 50nb, . . . for connecting to four sensors 22n for each wireless sensor node 20n, are illustrated in FIG. 3 that provide for differential inputs. Each of these four channels within each wireless sensor node 20n includes its own programmable gain amplifier 48n and programmable offset 52n. Three other channels, at pins 2, 3, and 4, are available that allow for direct input into A/D converter 28n without any amplification. This accommodates direct voltage input for sensors that have a range from 0-3.0 volts. Additionally, direct input for an internal temperature sensor is provided on channel eight of A/D converter 28n, labeled ° C., to provide temperature measurement since such sensor information as temperature can be directly provided to A/D converter 28n without amplification or other signal conditioning. Microprocessor 29n receives all eight of these input sensor digital data streams from A/D converter 28n and provides single digital data streams 26n' for transmission by RF transmitter 30n. A/D converter 28n has a multiplexer with 12 channels and is capable of providing 8 analog signals from 8 sensors 22n as a single serial data stream over a serial programmable interface (SPI) to microprocessor 29n. Microprocessor 29n adds framing bits and check sum bytes and presents data from these 8 sensors as a serial data stream to transceiver to frequency modulate a radio frequency (RF) carrier wave with this data. For example, a 1 of digital data may provide a frequency shift while a zero provides no frequency shift.

Sensor data from any of these sources can be logged into non-volatile memory 42n.

Quite a few of the hardware items included on the channelized remote sensing node of FIG. 3 are programmable, including the number of channels sampled, the programmable gain amplifier gain on each of four differential input channels 50na, 50nb, . . . offset trim 52n on each of four programmable gain amplifiers 48n, the duration of sampling in real time streaming mode, the sampling rate of the system in data logging mode, the analog voltage output value for DACs 54na, 54nb, 54nc, which are further described herein below, and the transmission frequency of programmable digital RF transmitter 30n.

Figure 4A:
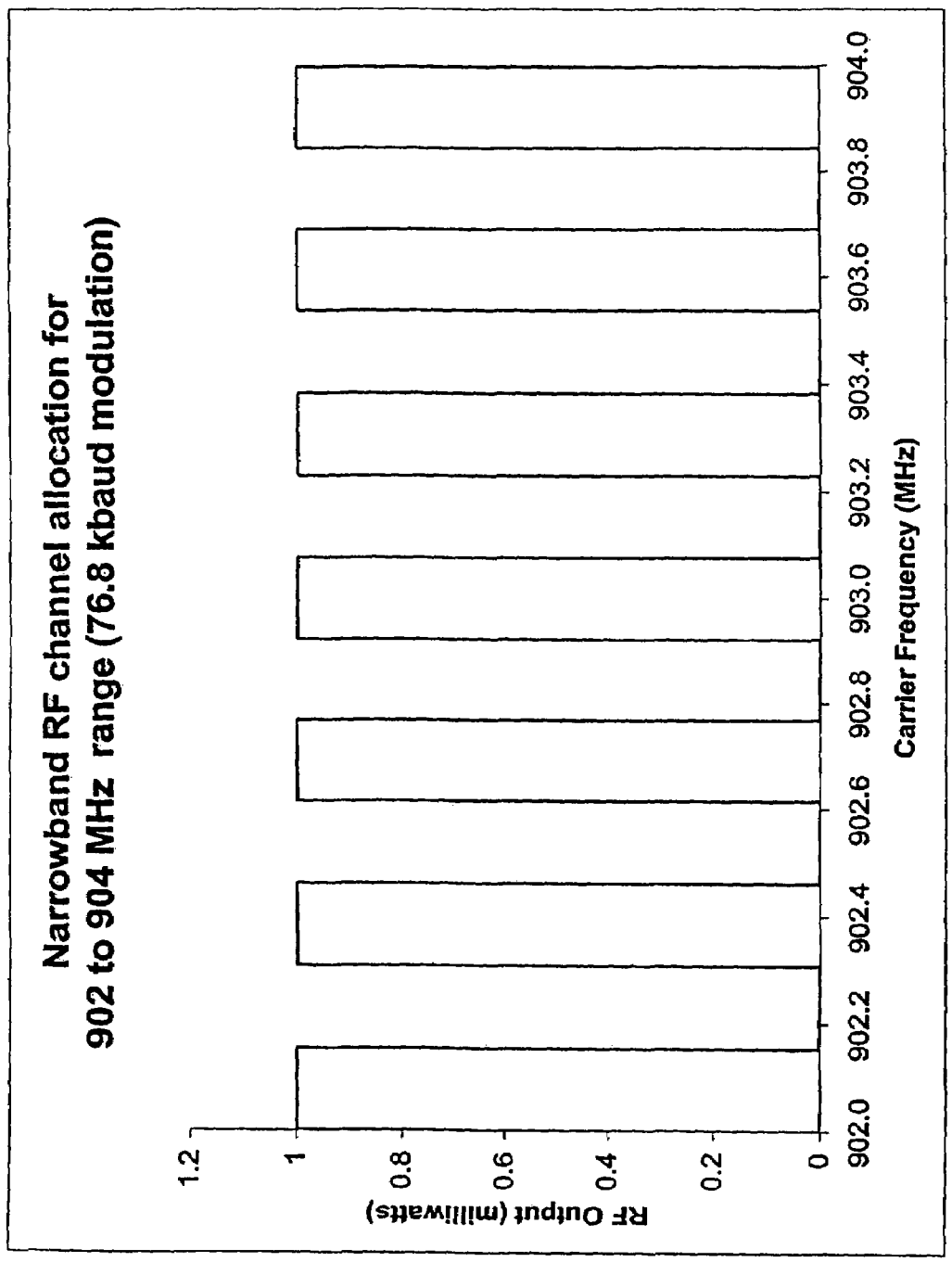
FIG. 4a is a chart illustrating bands within a radio frequency range of 902 to 928 MHz for narrow band radios having a digital communications rate of 76.8 Kbaud.
Figure 4B:
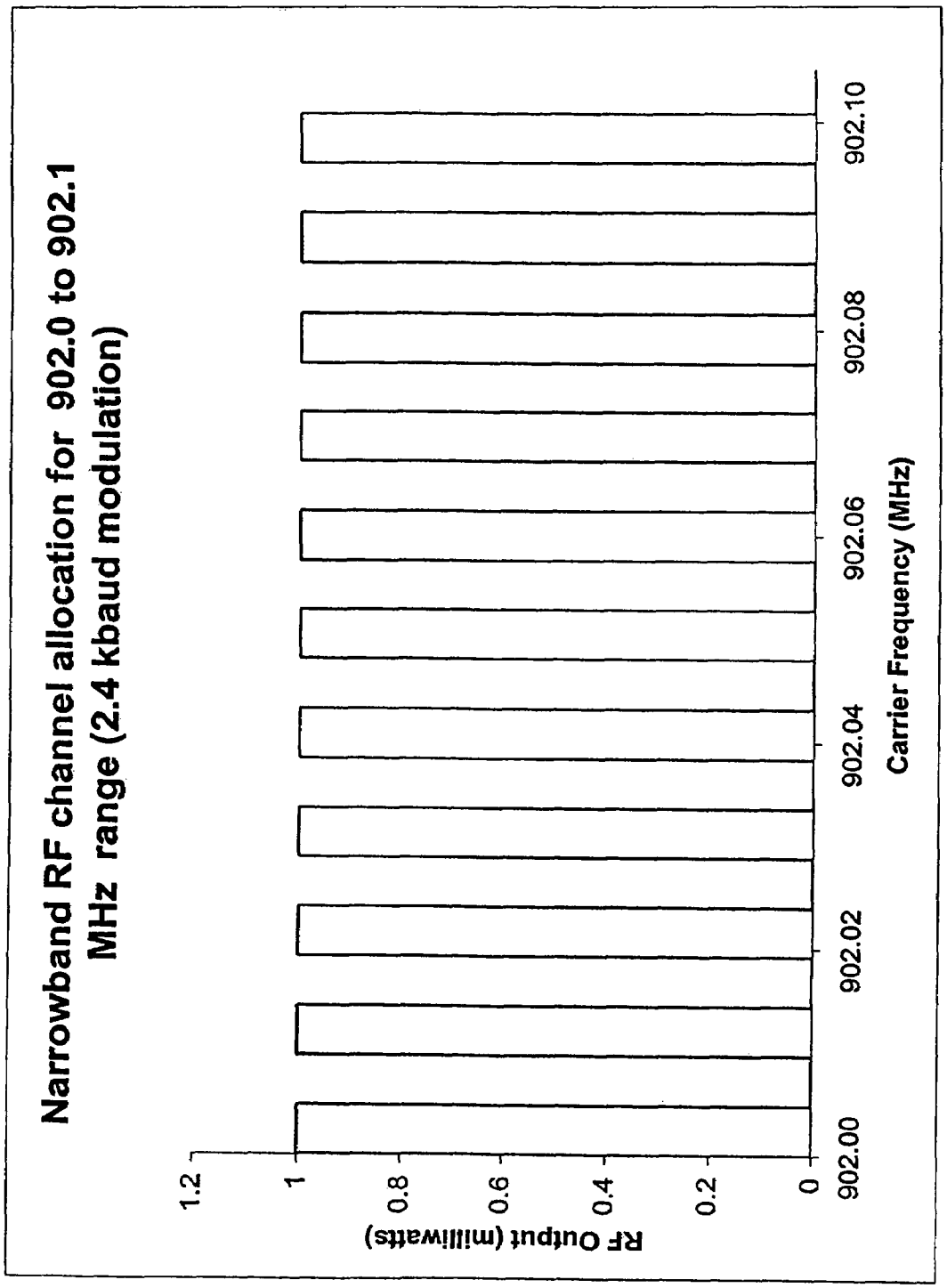
FIG. 4b is a chart illustrating many times as many bands within the same radio frequency range of 902 to 928 MHz as FIG. 4a for narrow band radios having a digital communications rate of 2.4 Kbaud.

Programmable frequency radio transceiver 30n incorporated in this embodiment is frequency agile, allowing the device to be programmed to operate over a range of frequencies in various RF bands, for example, bands of 400 MHz, 800 MHz, 900 MHz, and 2.40 Ghz frequencies. As shown in FIGS. 4a and 4b, radios operating at a higher data rate need more bandwidth and thus fewer RF communication channels are available. FIG. 4a is a chart illustrating channels within a radio frequency range of 902 to 928 MHz for narrow band radios having a digital communications rate of 76.8 Kbaud. The present applicants built apparatus with 26 channels at this data rate. It should be possible to provide several times more channels at this data rate. FIG. 4b is a chart illustrating the potential to obtain more than 1000 channels within the same radio frequency range of 902 to 928 MHz as FIG. 4a for narrow band radios having a digital communications rate of 2.4 Kbaud.

Several embodiments have been realized using the relatively new, highly integrated RF communications chips available from several sources, including the Xemics, Inc. Newchatel, Switzerland, chip XE1202 (400, 800, 900 MHz bands), which is a frequency programmable transceiver, the Chipcon CC1020 (400, 800, 900 MHz bands), and the Chipcon CC2420 (2.4 GHz band operating on IEEE 802.15.4 standard), Chipcon AS, Oslo Norway. With one of these RF communications chips providing transmitter 30n in each wireless sensor node 20n of a network of sensor nodes 18, each programmed to operate at a different frequency, multiple wireless sensor nodes 20n can transmit at the same time without concern about interference. Thus, base station 40 can receive data in true parallel data acquisition mode in which many wireless sensor nodes 20n can be transmitting to base station 40 from different locations on a structure simultaneously.

The present inventors found that power for operating electronic components of wireless sensor nodes 20n, could be provided through sensor power supplies 44n which can be processor controlled chip LP2980 (National Semiconductor, Santa Clara, Calif.), that receives power from rechargeable lithium-ion batteries 56n (for example, UBC 641730 from Ultralife Battery, Inc., Newark, N.J.). Thus, microprocessor 29n can control whether sensors receive power. A battery charge monitoring chip, such as PS501 battery manager, from Microchip Technology, Inc. Chandler, Ariz., or LTC4150 Coulomb Counter/Battery Gas Gauge, from Linear Technology, Milpitas, Calif., (not shown) could also be included to provide information about the battery's state of charge. Lithium-ion batteries, are thin, have high energy density, and exhibit no "memory effects" that plague other battery chemistries. The present inventors found that battery 56n was fully charged after about 45 minutes of charging. Indicator lights (not shown) were provided on wireless sensor node 20n to let the user know when charging was complete. They found that typical battery life on one charge was approximately 3 hours with continuous RF transmission. Energy harvesting can be used to recharge batteries, as described in commonly assigned U.S. patent application Ser. No. 10/379,223, "Energy Harvesting for Wireless Sensor Operation and Data Transmission," and U.S. patent application Ser. No. 10/769, 642, "Shaft Mounted Energy Harvesting for Wireless Sensor Operation and Data Transmission," both of which are incorporated herein by reference.

Most high speed data sampling applications do not require sampling for such a long duration, however. The present inventors found that a typical sampling application duty cycle allowed operation for 2-3 days of use before recharging was needed. They found that after 500 recharge cycles, these lithium ion batteries retained approximately 80% of their initial capacity.

Microprocessors 29n can include a sleep state. They can include a program to turn off power to transmitter 30n and sensor power supply 44n as well as a program to routinely enter the sleep state to reduce power consumption. Microprocessors 29n can be programmed to enter sleep state between individual samples or between bursts of samples to save power, as described in the '223 and '642 applications.

Microprocessors 29n can also be programmed to use data compression strategies, such as average fast fourier transform (FFT). Once the FFT has been calculated the processor can compute average output over a range of frequencies to reduce the amount of data that is transmitted. For example, for an FFT calculated over a range from 0 to 100 Hz, using data acquired from 3 triaxial accelerometers at a sampling rate of 2000 Hz, a total of 6000 data points would be collected before data compression each second. The computation of the FFT provides the same amount of data. But if the average output is computed in increments of 10 Hz over 0 to 100 Hz then only 30 data points are needed for the triaxial accelerometer array, a data reduction of 200 times, to reduce the amount of data that they transmit over the air and thereby save power. Decimation, where the data point sent is the average of n data points sampled, can also be used to reduce the amount of data transmitted. This averaging on the fly also saves considerable power. It can also allow use of a lower baud rate, which allows more channels and more wireless sensor nodes transmitting simultaneously.

An alarm status can be encoded on the digital data stream. Alternatively, another radio frequency can be used for transmitting data related to an alarm status. In one embodiment, data compression may be used on the digital data stream while uncompressed data can be transmitted on the frequency dedicated to alarm status, and this frequency can be provided with greater band width to permit higher speed data transmission.

Based on data received from sensor node 20n, base unit 40 may transmit a digital instruction to transceiver 30n in sensor node 20n to actuate a device to which it is connected. Either a digital signal or an analog signal may be needed to actuate the device. If an analog signal is needed to actuate the device it may be provided from microprocessor 29n through digital to analog converters 54na, 54nb, 54nc on wireless sensor nodes 20n. Various external devices may thereby be controlled using signals to different ones of digital to analog converters 55na, 54nb, 54nc within sensor nodes 20n. For example, a motor controller or machine "kill switch" could be activated to prevent damage to a machine or structure being monitored.

The different frequencies for RF communications could also be used for applications in addition to the n frequencies for the n sensor nodes 20n to transmit their sensor data to base station 40. For example, another frequency could be provided for each of the sensor nodes 20n to indicate a change in status of data sensed by one or more of sensors 20n connected to that sensor node 20n. For example, another frequency could be used for transmitting alarm communications. If sensor 22b connected to wireless sensing node 20b indicates that the machine that sensor 22b is mounted on needs servicing, base station 40 could reprogram the operating parameters of wireless sensing node 20b to transmit at a higher data rate and at a transmission frequency reserved for this purpose.

Figure 5:
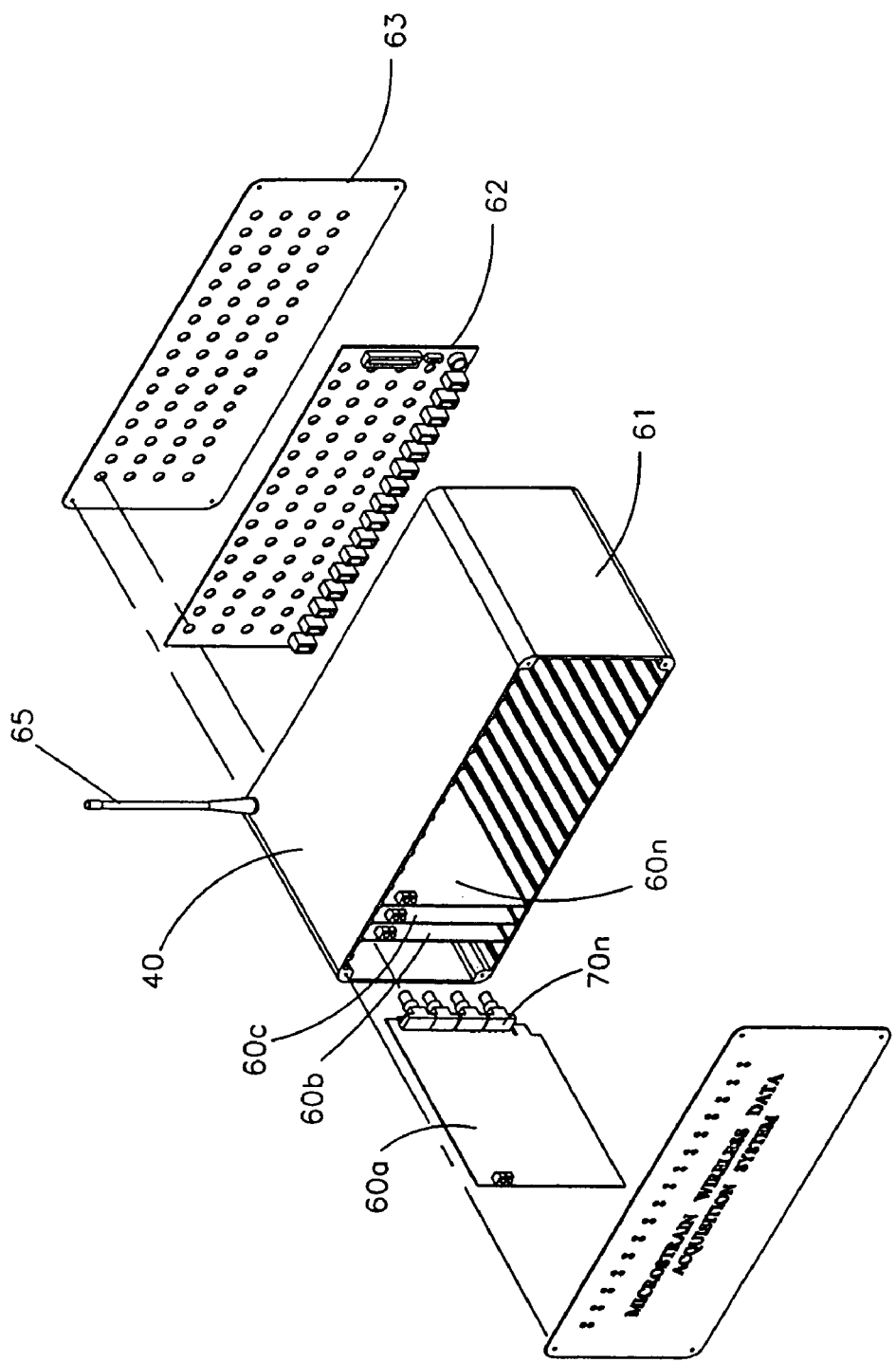
FIG. 5 is a three dimensional view of the enclosure and boards of the base station of FIGS. 1, 2 and 3.

Digital RF signals 32n from wireless sensing nodes 20n are all received in multi-receiver base station 40. One embodiment of base station 40 includes separate boards 60a, 60b, 60c . . . , collectively represented as boards 60n, as shown in FIG. 5. Boards 60n are designed to be plugged directly into enclosure 61 with backplane 62, into which boards plug, and back cover 63. Each of boards 60n includes separate receiver or transceiver 64a, 64b, 64c, . . . , as shown in FIG. 2, collectively represented as receiver or transceiver 64n, for receiving digital RF signals 32n simultaneously from each sensor node 20n of array 18. One embodiment of enclosure 61 allows for up to 16 of boards 60n, each with its own transceivers 64n to be located in enclosure 61, which allows for data to be collected from 64 sensor channels simultaneously, 128 when all eight sensor channels of each wireless sensor node are included. Note, however, that FIG. 5 shows only 4 of these outputs. More outputs can be accommodated than shown.

Receivers 64n on base station 40 can incorporate the same channelized RF transceivers 30n that are used on remote sensing nodes 20n. Reception to each of these transceivers may be through common antenna 65 on base station 40. Each received digital data stream 66n provided as an output of each receiver 64n of multi-receiver base station 40 should be identical to digital data stream 26n' (except if there is a transmission error as further discussed herein below) in sensor node 20n that separate receiver 60n is receiving data from. Thus, continuous data streaming from sensor nodes 20n is simultaneously received at base station 40, each on a unique frequency.

In order to easily interface with existing data acquisition hardware (not shown), the present inventors also provided a digital to analog conversion and an analog voltage interface at base station 40. They thus wirelessly provided fast analog output signals from multiple sensing nodes each with deterministic latency and minimal data acquisition latency. Using serial communications rates of 76.8 Kbaud, they found that they could transmit 12 bit data from one sensing channel at a rate of up to 1.7 KHz. They sliced the 902-928 MHz band into 26 channels, each channel communicating sensor data as fast as 1.7 KHz. For example, with this system architecture, up to 26 base station transceiver modules (208 separate sensor channels) can be used simultaneously in the same airspace. These could be housed in 2 base stations with 16 modules in one of them and 8 in the other. With slower baud rates more radio channels can be provided though data rate for each is lower.

Base station 40 rebuilds each transmitted received digital data stream 66n into analog outputs 24n" using digital to analog converters (DACs) 68n on each board 60n. DAC's 68n are programmed to provide high level, high data rate reproduction of the original waveforms from each channel provided by each of the individual wireless remote sensing nodes 20n at base station output pins 70n. These analog output pins 70n provide analog signals that emulate eight wired parallel data acquisition systems that are commonly used for data acquisition from eight sensors. In addition, use of the Chipcon CC2420 channelized transceiver design provides ability to program the device to be compatible with worldwide radio frequency communications standards, such as IEEE 802.15.4.

Software for each base station microcontroller 72n on each base station board 60n manages each RF transceiver 64n, collects streaming data 66n received from remote wireless sensor nodes 20n, and sends data to A/D converter with onboard multiplexer, for example MCP3204 from Microchip Technology, Inc., Chandler, Ariz., on each board 60n and in each frequency channel to better convert each received digital data stream 66n back to eight analog signals 24n" that closely approximates each of the eight analog voltage signals 24n' acquired from the eight sensor inputs in wireless sensor nodes 20n, and these analog signals 24n" are provided at eight output pins 70n (only four are shown).

Analog output signals 24n" can be voltages or they can be current levels, such as currents in the 4 to 20 ma range to be compatible with industrial process control systems that traditionally have used current output in the 4-20 ma range. The XTR110 chip from TI/BurrBrown, Tucson, Ariz., can be used. Microprocessor sends serial data to D/A 68n over the SPI interface which instructs the D/A to output analog voltages for the correct number of channels and at the correct output voltage levels and to the correct output pins corresponding to the digital information received by microprocessor 72n. The information to accomplish this is provided along with the data stream.

Thus, base station 40 facilitates simultaneous reception of data from wireless remote sensing nodes 20n and converts that data into analog voltage or current that is compatible with most computer systems and/or data acquisition systems. By converting the digital data received at base station 40 back to high level analog voltages the present application provides for high speed data acquisition with deterministic delay times, as described in a paper by Steven Arms et al, "Frequency Agile Wireless Sensor Networks," March 2004, San Diego, Calif., SPIE Smart Structures and Smart Materials Meeting, incorporated herein by reference. That paper describes an experiment to determine time delays in which triangle waves from a function generator were directly applied to channel one of an oscilloscope and to a wireless sensor node. Data from the wireless sensing node was sent via RF to the analog output base station where it was reconstructed as an analog voltage. This output voltage was connected to channel two of the oscilloscope and the time delay between the two waveforms was directly measured.

While the simultaneous high speed wireless streaming capability from 52 channels in aggregate uses substantial power, in contrast to the dominant goal of lowering power, the present inventors found that by making these devices programmable and by lowering the sample rate, sleeping between samples, transmitting reduced or compressed data or lowering the update rate, they could reduce power consumed by each wireless sensor node, as described in an abstract by Steven Arms et al, "Power Management for Energy Harvesting Wireless Sensors," March 2005, San Diego, Calif., SPIE Smart Structures and Smart Materials Meeting, incorporated herein by reference and as described in the '223 and '642 applications.

The present inventors also recognized that by providing a large number of these "virtual wires," and eliminating real wires, they provide a scheme for real time learning about structures, machines, and subjects that would not be possible using real wires.

Once analysis of real time streaming data reveals patterns, this same network of wireless remote sensing nodes 20n could be deployed in a much lower power mode, transmitting much smaller amounts of data. For example, decision making algorithms or pattern recognition software could then be uploaded to each of remote sensing nodes 20n by the end user, and local analysis of data provided, vastly reducing data transmission and power consumption. In one example, only update data or a summary of update data or alarm notices are transmitted periodically, at battery-saving low data rates from each of wireless sensor nodes 20n.

In addition, the present application maintains a digital interface to each boards 60n of base station 40 to facilitate re-programming of base station 40. This digital interface also facilitates re-programming of remote sensing nodes 20n by communication through base station 40.

Boards 60n on base station 40 can each communicate to other base station devices, such as personal computer 80, through asynchronous digital serial interfaces 116n or 118n, such as USB, RS-232 or RS-485. Asynchronous serial interfaces 116n or 118n allow personal computer 80 to set up sampling parameters on wireless remote nodes 20n through base station 40, trigger data collection from wireless remote nodes 20n through base station 40, and download data to base station 40 from wireless remote nodes 20n.

Boards 60n on base station 40 can also communicate to other devices, such as data analysis equipment (not shown), through their high level analog output pins 70n. Eight analog output pins 70n on each of board 60n provide the eight transmitted digital sensor data, allowing analog output pins 70n to be plugged directly into a conventional data acquisition system (not shown) for standard analysis.

One issue with wireless data acquisition occurs when samples are dropped due to the limitations of the communications link. If wireless remote sensing node 20n is positioned out of reliable communications range or if an interfering signal is present on a communications channel, transceiver 64n on base station 40 will not update the reading during that event. For the purposes of timing synchronization and error detection, additional timing pulse output is provided a the base station to signify each valid sample update of the analog outputs. When a communications error is encountered (as evidenced by a checksum error), the four analog outputs for that sample period will continue at the last known valid reading, and the timing pulse will not be provided for the duration of the erroneous sample. The timing pulse train will resume when the next valid (no checksum) samples are received.

Figure 6:
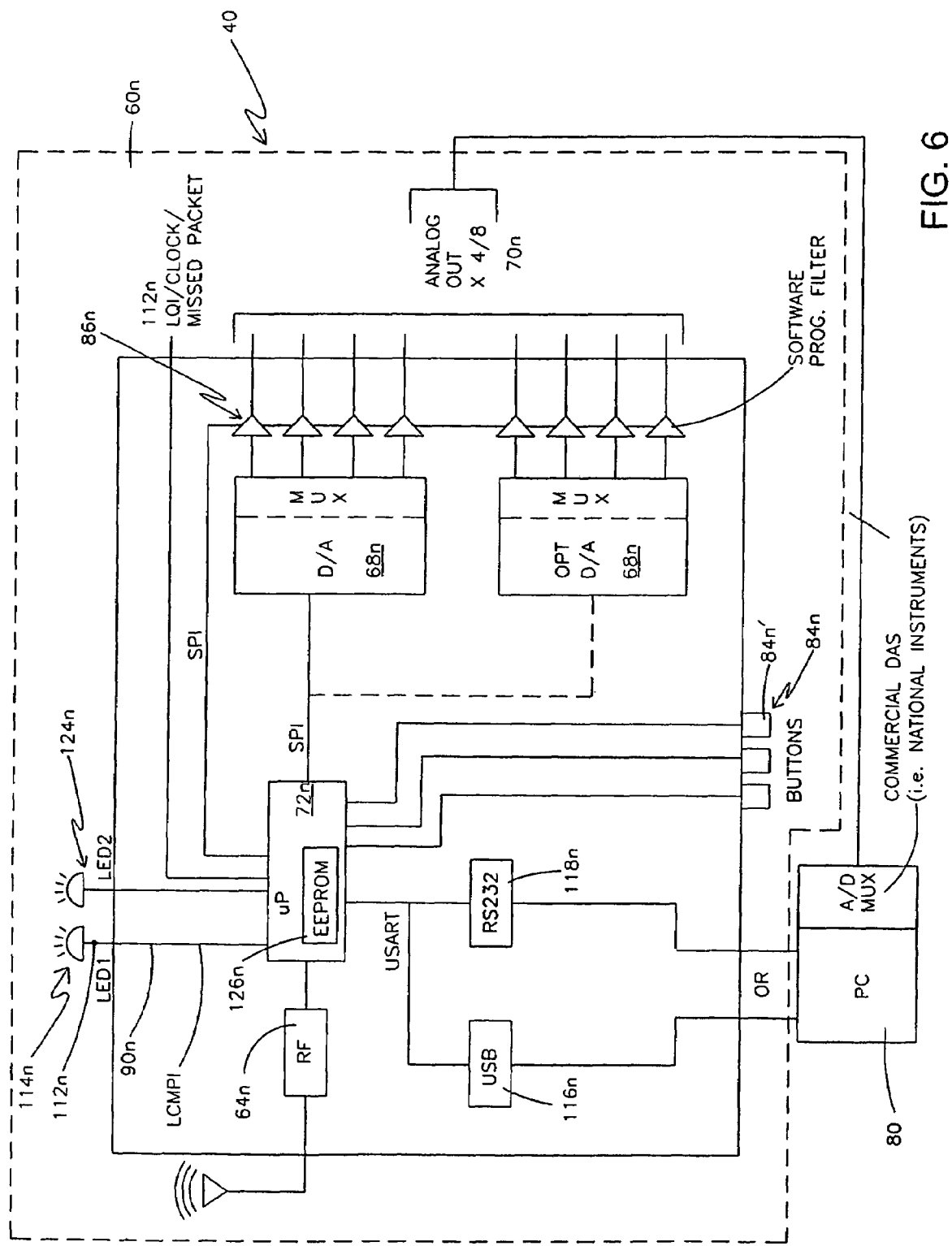
FIG. 6 is a block diagram illustrating a single board of the base station of FIGS. 1 and 2.

Various schemes for error checking or error correction can be used, including check sum, cyclical redundancy check, parity, and forward error correction, and data redundancy. In one scheme for error checking, processor 29n in sensor node 20n calculates a number characteristic of digital sensor data 26n' for transmission by node transmitter 34n along with digital sensor data 26n'. The number can be the sum of the values in a packet of digital sensor data 26n'. If microprocessor 72n in base station 40 calculates a different number from received data 66n then microprocessor 72n provides an error signal at output 112n indicating an error, as shown in FIG. 6 and in box 208 of FIG. 7.

In another scheme for error checking, digital sensor data 26n' is transmitted twice by wireless sensor nodes 20n. The two received data signals 66n are compared in base station 40 to determine if there was a transmission error for one of them. A checksum can be transmitted with both transmissions and base station 40 can calculate checksums for both transmissions. If there was an error base station 40 can select the data for which the checksum is correct. Thus, base station 40 can both detect an error and provide a form of error correction without the need for base station 40 sending a signal to sensor nodes 20n requesting retransmission.

Another scheme for error checking is sending an odd number of transmissions of the same sensor node data 20n and to using voting to select the valid data.

Base station provides the error signal on the checksum line to allow the end user to flag data coming on the data lines, that has an error. If it was a transmission problem, all eight data lines would likely have been affected.

Figure 7:
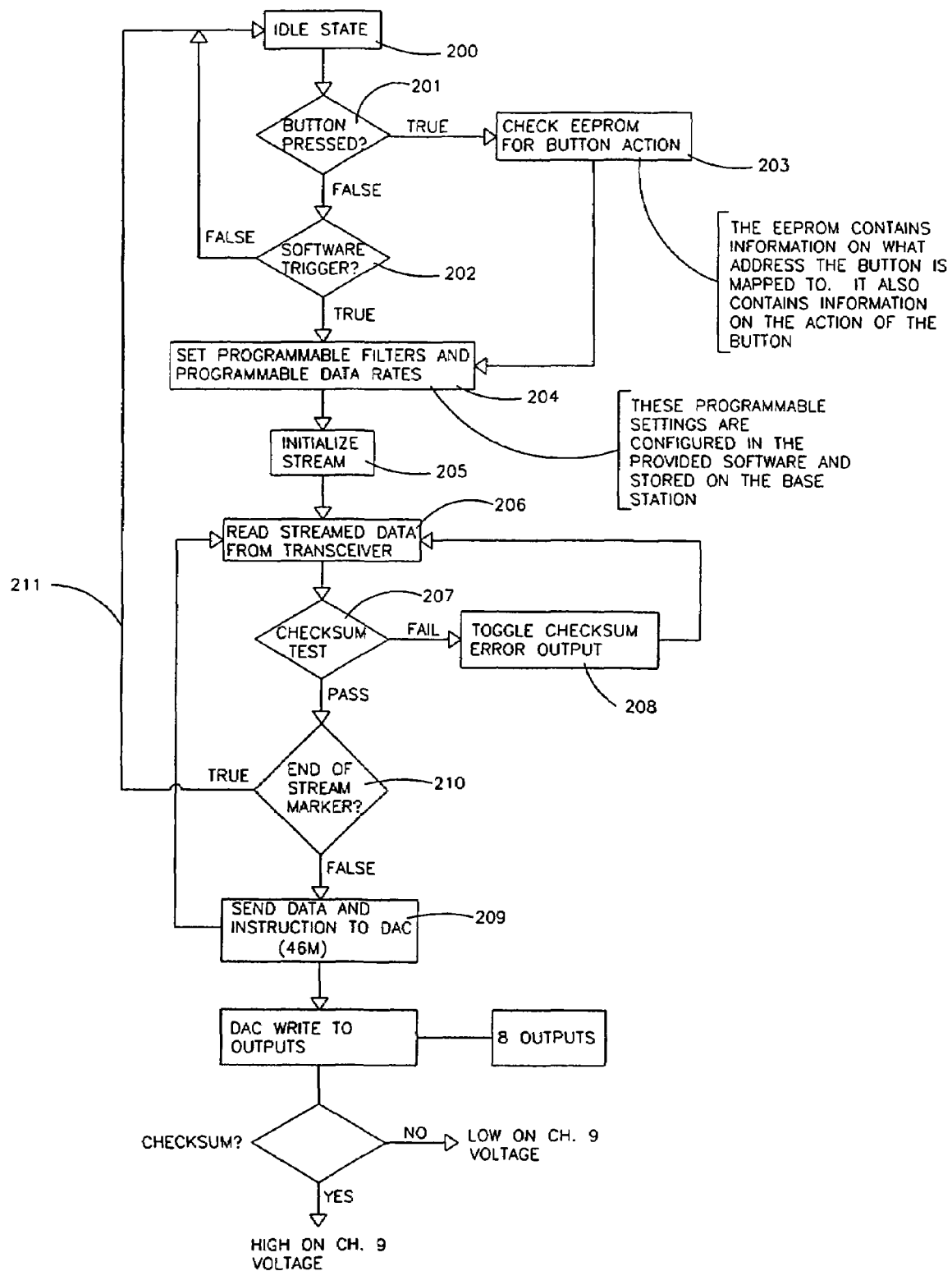
FIG. 7 is a flow chart showing the program running in a microprocessor on a board of the base station of FIGS. 1, 2, 5, and 6.

A flowchart showing the software or firmware to run on base station microprocessor 72n is shown in FIG. 7. In one embodiment, each of the wireless sensor nodes 20n awaits a signal from board 60n of base unit 40 before transmitting sensor information, as shown as idle state in box 100 of the flow chart. Transmission of sensor information can be initiated either by a user pressing one of buttons 84n on board 60n on base unit 40, as shown in box 201 and in FIG. 6, or by a user providing a software trigger on personal computer 80 connected to board 60n, as shown in box 202. If one of buttons 84n is pressed then microprocessor 72n checks EEPROM within microprocessor 72n for a program indicating what to do in response to button 84n being pressed, as shown in box 203. Based on this information, programmable filters 86n, described herein below, and programmable data rates are set, as shown in box 204. These programmable settings for programmable filters 86n and data rates are configured in the software provided by computer 80 that gets downloaded to microprocessor 72n. If either of these initiating events occurs, then microprocessor 72n sends a command to sensor node 20n to initialize and begin transmitting sensor data, as shown in box 205.

In the next step, data streamed from sensor node 20n is received at RF communications hardware transceiver 64n on board 60n of base unit 40, as shown in box 206, to provide data 66n. Microprocessor 72n performs error checking on received data 66n as shown in box 207. If error checking fails then an indication of error, such as a light, is provided on an output of card 60n, as shown in box 208. Also analog output line 90n on board 60n provides an analog signal of the error event.

Wireless sensing nodes 20n can be set to stream data continuously without ever stopping. They can also be set to stream data for a programmable period of time. Alternatively, wireless sensing nodes 20n can be software programmable to send periodic data updates, for example, once every second, or once per minute, or once per hour.

If error checking demonstrates no error in received data 66n, then signal 92n is provided by microprocessor 72n to digital to analog converter 68n to regenerate analog signal 24n'', as shown in box 209, updating the output of digital to analog converter 68n. If the signal includes an end of stream marker that is generated by sensor node 20n then microprocessor 72n returns to its idle state as shown by box 210 and line 211.

The present inventors have defined Link Quality Indicator/Clock/Missed Packet Indicator (LCMPI) 100, which is a pulse width modulated timing signal 100. Period T1, T2, T3 of signal 100 is proportional to packet transmission rate from wireless sensor nodes 20*n*, as shown in FIG. 8*a*. The duty cycle, or the ratio of time at up level 108 to period (time at up level 108+time at down level 110) of signal 100 is proportional to link quality which includes a weighted average of bit error rate and received signal strength indicator (RSSI). The higher the duty cycle the better these two parameters. The weighting is programmable and can be changed to meet requirements of a particular application. In one embodiment, an error causes the duty cycle to decline to 50% or less.

Fraction of time spent at up level 108 thus depends on a composite of two inputs, the presence of good data and the strength of the radio signal. Good data is determined by passing an error detection test, such as check sum, cyclical redundancy check, forward error correction, etc. Strength of radio signal is determined by RF transceiver 64*n* and this strength information is provided by RF transceiver 64*n* to microprocessor 72*n*. Link quality indicator is greatest when signal strength is strong and no errors are detected, as shown by LQI1 and LQI4 in FIG. 8*a*, which have the minimum amount of time spent at down level 110 and the maximum amount of time spent at up level 108. An intermediate level of link quality indicator part 104 is shown by LQI2, LQI3, and LQI5. The link quality indicator is least when signal strength is weak and errors are detected. For example, as shown for LQI6, if a packet of data is missed, for example because of failing a check sum, the pulse width modulated signal goes to a duty cycle of 50%.

The output of LCMPI 100 is 0-3 volt digital signal capable of being processed by an analog data acquisition system, as shown in FIG. 8*a*, which thus provides both timing information and link quality information, including information concerning signal strength and error rate.

LCMPI 100 with its analog level output values can be provided as additional output pin 112*n* at base station 40, as shown in FIG. 8*a*. LCMPI signal 100 may be used to drive LED 114*n*, as shown in FIG. 6. Because of the greater amount of time LCMPI 100 spends at high level 108 for a stronger signal with fewer errors, LED 114*n* will become brighter than for a weaker signal or one with more errors for which LCMPI 100 spends more time at low level 110. Regardless of signal strength and error rate, timing for the arriving data can be obtained from measuring the time between falling edges of LCMPI signal 100.

The quality of signal analysis described herein above for base station 40 could be performed either by microprocessor 79 in base station 40 or it can be performed by microprocessor 29*n* in wireless sensor nodes 20*n*. The analysis can be performed on several radio frequency bands so as to choose the quietest band with the strongest signal and the fewest errors for each wireless sensor node-base station link. If base station 40 performs this analysis it can communicate results to wireless sensor nodes 20*n* on network 18. In assigning bands to the various wireless sensor nodes of network 18 base station 40 assigns different frequency bands to different wireless sensor nodes 20*n* to avoid collisions and it adjusts the arrangement of these bands among wireless sensor nodes 20*n* to optimize transmission.

The link quality indicator can include a sum or a weighted sum of indicators including checksum, checksum frequency, checksum history, current received signal strength indicator (RSSI), RSSI history, or some other error detection rate. This provides a number indicating the quality of the wireless link at a particular time and a confidence margin for the data transmitted at that time or during the time data was transmitted. One example of a wireless link quality indicator is transmission errors per minute. An output voltage corresponding to number of transmission errors per minute could be provided as an input to the wireless link quality indicator. Digital USB line 116 and RS232 line 118 could also be used to provide this quality information.

Standard forward error correction techniques can also be used to increase transmission reliability and reduce error rates, such as Reed-Solomon coding, well known in the art.

An alarm signal can be provided in addition to the analog data output. The alarm signal can be connected to a speaker, light, or other output device (not shown) to indicate a problem found by sensor node 20*n*, such as a sensor parameter exceeding a threshold. For example, green, yellow, and red lights could be used to indicate normal operating range, transition, and alarm status.

Battery status at sensor node 20*n* can also be separately provided as battery status indicator output signal 122*n* at base station 40. Multicolor led 124*n* can be used to indicate charge status of battery 56*n* on nodes 20*n*, as shown in FIG. 6.

Three buttons 84*n* are provided on base station 40, as shown in FIG. 6. Three wireless sensor nodes can share each frequency band while buttons 84*n* are used to select which of the three communicates and which two don't communicate at any given time. When button 84*n*' is pressed, microprocessor 72*n* checks its on board EEPROM 126*n* for button action and the address button 84*n*' is mapped to and provides that base station 40 receives at the frequency programmed by button 84*n*'. With 16 bit addressing up to 65,000 wireless sensor nodes 20*n* can be addressed. Although there are likely many fewer frequency bands available, a user can use buttons 84*n* to provide two more wireless sensor nodes 20*n* transmitting and receiving data on the same frequency band. Frequency programmed by buttons 84*n* can be changed through processor 72*n*.

Filtering is provided to remove high frequency elements left from the D/A conversion, as shown in FIG. 8*b* and to smooth the analog data so it is more like input signal 24', as shown in FIGS. 8*c*. Thus, programmable filter 86*n* converts the staircase Appearance of unfiltered signal 134 of FIG. 8*b* from D/A converter 68*n* into a much smoother analog signal 136, also shown in FIG. 8*b*. Processor 72*n* can write instructions to programmable low pass filter 86*n* to control its cutoff frequency as needed by the particular rate data is being transmitted. In one embodiment of programmable filter 86*n*, sample update data points 138 are connected with smooth curves 136 which approximate what is likely to have occurred between sample update data points 136 in sensor 22*n*, except for missed data point 140 where LQI6 indicated low signal strength or errors in the data transmission.

Software programmable filter 86*n* should be programmable so it can adjust filtering for the data rate from each sensor, which is equivalent to the number of samples per second on a particular frequency channel. If several sensors 22*n*1, 22*n*2, 22*n*3, . . . 22*nm* feed data to a single sensor node 20*n*, then the data rate of data from each sensor 22*n*1, 22*n*2, 22*n*3 may be a fraction of the data transmitted by that node 20*n*, so filter 86*n* should include this change in data rate in its programming. Thus, the present inventors provided dynamically variable programmable filter 86*n* whose frequency response could be adjusted for the data rate transmitted and for the number of sensors 22*nm* feeding data to sensor node 20*n*.

Figures 9A, 9B:
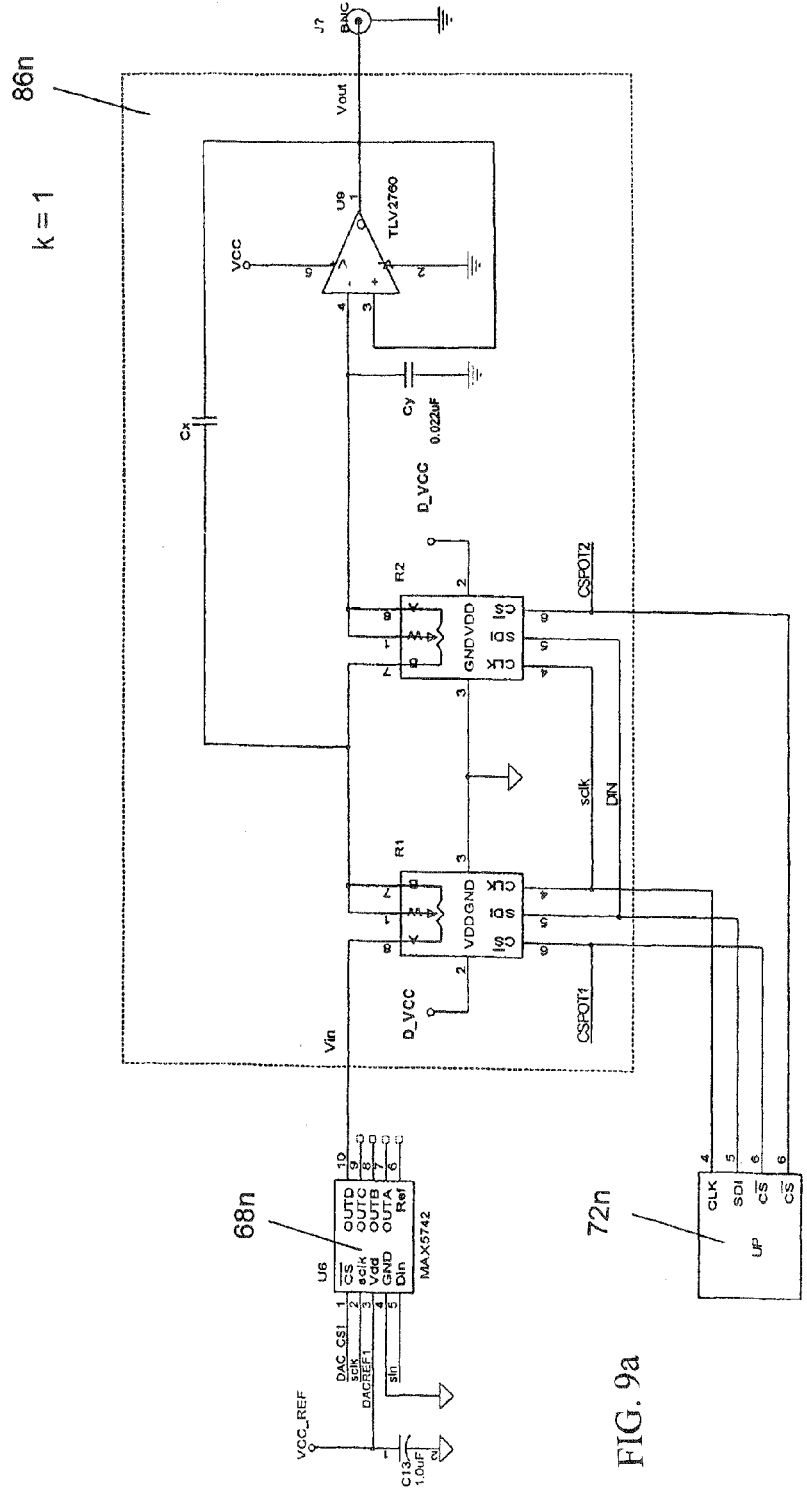

One embodiment of programmable filter 86*n* includes digital potentiometers R1 and R2, operational amplifier U9, and capacitors Cx and Cy, as shown in FIG. 9*a*. The transfer equation for operation of this filter is shown in FIG. 9*b*. Filter 86*n* is connected to digital to analog converter 68*n* and to microcontroller 72*n*, as shown in FIGS. 2, 6 and 9*a*. A BNC connector is at analog output Vout of filter 86*n*, as shown in FIG. 9a. As filter 86n is for use in base station 40, as shown in FIGS. 2 and 6, base station 40 therefore also has this BNC connector at its analog output.

Figure 10:
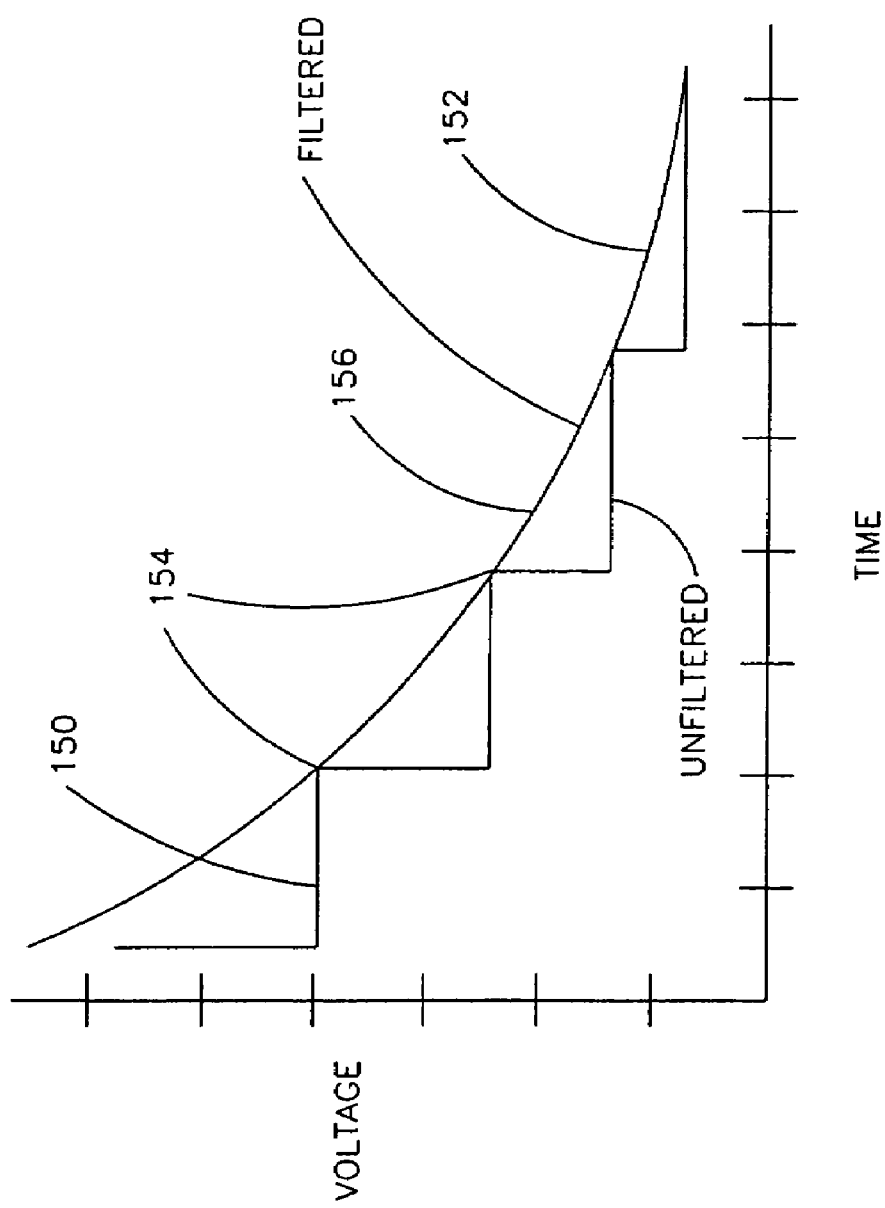
FIG. 10 includes another embodiment of filtering with two charts, a staircase chart indicating output of the D/A converter in the base station and a smooth chart indicating result of interpolating to provide a smooth representation of these data.

Another way to filter avoids such staircase data as unfiltered signal 150 by creating data points 152 interpolated between sample update data points 154 based on several sample update data points 154, as shown in FIG. 10. This approach is performed in microprocessor 72n before the signal is processed in D/A converter 68n. One way to accomplish this interpolating is for microprocessor 72n to provide weighted averages of two adjacent sample update data points 154 and to provide intermediate points 152 from just those two sample update data points 154. A weighting scheme can be used to provide many intermediate data points 152 with the weight depending on the time from the first of the two sample update data points 154 to provide smoothed signal 156.

Filtering can introduce time delay because of the time it takes to determine the intermediate points. So there is a tradeoff between smooth output and avoiding a time delay. This system has been designed to be software programmable so the system can be optimized for a specific application.

In addition a PC based computer program allows for configuration of parameters on wireless sensor remote nodes 20n. As described herein above, each base station board 60n has its microprocessor 72n configured from personal computer 80 via USB port 116n or RS232 port 118n, as shown in FIG. 6. Data stream rates, how many data channels, which data channels to use, which error correction technique to use, which software programmable filters 86n to use, and other control signals can be provided to microprocessor 72n from external computer 80 via port 116n or RS232 port 118n.

A well known scheme for transmitting data is time division multiple access, in which each of sensor nodes 20a, 20b, 20c, . . . has its own address and each of sensor nodes 20a, 20b, 20c is sequentially interrogated. In this case, all data can be transmitted at a single radio frequency, and base station 26 need have only a single receiver capable of receiving data at only that frequency. However, in this case data for only one sensor node of sensor nodes 20n is transmitted at a time over a specific radio frequency.

Another scheme for transmitting is to provide each of sensor nodes 20n with a code identifier. Base unit 40 broadcasts a particular code for sensor node 20b. This code may be received by all sensor nodes 20n but it only tells specific sensor node 20b to transmit its data. With this scheme one sensor node may be transmitting in real time. Which sensor is transmitting can be changed but the ability to simultaneously receive data from multiple sensors is still lost. The base station processor can be programmed to run in a loop where it broadcasts a series of codes for sensor nodes to sequentially scan those nodes that all operate on the same radio frequency. This is equivalent to programming the buttons to sequentially direct different nodes to transmit. This approach can be used in combination with multiple RF communications frequencies and multiple boards on multiple base stations so data from many wireless sensor nodes can be received, far beyond the number of frequencies used.

Another scheme for receiving is one in which base station receiver 40 can scan through different frequencies to receive data from different nodes 20n at different times. In this scheme, base station 40 can have a receiver capable of scanning and receiving on any of the frequencies. But the ability to simultaneously receive is still lost.

Another scheme is to have the node transmitters 30n set to transmit at random time intervals to avoid collisions with transmissions from other node transmitters 30n. In this scheme, base station 40 can has receiver capable of scanning and receiving on any of the frequencies. But the ability to simultaneously receive is still lost.

A spread spectrum modulation method can also be used in which the energy of the RF signal is spread over a wide bandwidth. A code sequence known to both transmitter and receiver determines how that energy is spread so a base station having a spread spectrum receiver can receive from sensor nodes with orthogonal codes without interference from one to another. For example for the IEEE 802.15.4 standard 16 channels are serviced in the 2.4 Ghz communications band.

Two standard communications schemes commonly used in the PC industry are becoming increasingly ubiquitous for wireless communications: the most prevalent is 802.11b (also known as WiFi), and the other is 802.11c (also known as Bluetooth). Both of these standards utilize spread spectrum communications in the 2.4 GHz frequency range. These could also be used herein.

The present inventors recognized that narrowband RF communications links have previously been limited in that only one node could communicate at a particular instant in time; otherwise data from different nodes would collide, causing errors in data at the base station. Thus, the user would specify a particular node address to communicate at a particular time, and those communications could not be continuous—they had to stop after a period of time in order that other nodes on the network could be addressed.

The present application provides a way to satisfy the need for a high speed wireless sensor interface that allows multiple transceiver nodes to communicate simultaneously to a central base station with low latency. The scheme also includes the ability to communicate hardwired sensor data along with the wireless sensor data. The scheme uses frequency agile RF communications links. Using software programmable RF communications, they found that they could program each node on wireless sensor network 18 to operate on a distinct portion of the RF spectrum. They also provided a base station with multiple receivers to simultaneously receive from all nodes at once. Using this scheme they found that all the nodes could transmit simultaneously and all the data from all the nodes could be received simultaneously without collisions or other interference. Furthermore, using this scheme they were able to retain timing information intact and operate each node at low power. They were also able to provide error detection or error correction in each channel. Thus, they were able to vastly improve sensor network communications.

In high speed streaming mode two pre-selectable modes of operation can be provided, continuous absolute sensor mode (CASM) and continuous differential sensor pulse code modulation (SPCM). In CASM mode the system simply digitizes the sensor data, packetizes the data, and modulates the RF carrier with the digital data. The SPCM mode will use specialized data encoding techniques known as delta compression to increase the sampled sensor data throughput by up to 4.5 times. In SPCM a more efficient data packet is built that utilizes one sampled data sensor data point plus a number of consecutive sensor data points that represent the difference from the initial sampled sensor data point. The difference is a smaller number and needs fewer bits, thus providing compression. This allows encoding more sensor data into smaller digital packets. For example, the maximum data transfer in CASM mode for one channel is 1920 sensor samples/second, while the maximum data transfer in SPCM mode is 8640 sensor samples/second.

There are two potential downsides to SPCM, first if one data packet is lost, more than one data point is lost. Second, since the data in SPCM mode is differential with respect to the first two bytes in the data packet, any errors that occur in the data stream will accumulate until the next data packet is received.

The parameters of the SPCM mode are programmable, allowing the user to select the characteristics of the SPCM mode. A standard being prepared by the IEEE P1451.4 working group defines how analog transducers can include, within non-volatile memory, information which defines a transducer electronic data sheet (TEDS) embedded in the sensor for self-identification and self-description. The TEDS data may be accessed by the base station transceiver for a specific node on the network in order to facilitate a setup of the base station output signals, such as bandwidth of the filters on the output. The firmware and hardware on the remote module support the IEEE1451.4 standard as an optional feature.

One embodiment of the wireless sensor system described herein has characteristics as shown in FIG. 11. Other characteristics can also be provided.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A measurement system, comprising:
    sensors;
    a network of wireless sensor nodes, wherein at least one of said sensors is connected to each said wireless sensor node, wherein each said wireless sensor node includes a node transceiver configured to transmit digital data derived from said at least one sensor; and
    a base station configured to receive transmitted digital data from a plurality of said wireless sensor nodes of said network of wireless sensor nodes, determine whether there is an error, convert to analog, provide an analog output, and provide an output indicating whether an error was found, said base station including:
        a base station transceiver configured to receive transmitted digital data from at least one wireless sensor node of said network of wireless sensor nodes and to provide at least one received digital signal derived from said transmitted digital data;
        a processor configured to analyze said at least one received digital signal for detecting an error;
        digital to analog circuitry configured for converting said at least one received digital signal into at least one received analog signal;
        a first analog output connected to provide an analog output signal derived from said at least one received analog signal; and
        a second output connected to provide an output signal indicating presence of an error in said received digital signal.

2. A measurement system as recited in claim 1, wherein a first of said wireless sensor nodes is connected to a plurality of said sensors, wherein said first wireless sensor node provides a digital data stream that includes data derived from said plurality of sensors.

3. A measurement system as recited in claim 1, wherein said base station further comprises a plurality of said base station transceivers, wherein each one of a plurality of said wireless sensor nodes is configured to transmit at a different frequency from others of said plurality of wireless sensor nodes, and wherein each one of said plurality of said base station transceivers is configured to receive at a different frequency from others of said plurality of said base station transceivers.

4. A measurement system as recited in claim 1, wherein a plurality of said wireless sensor nodes are configured to transmit at the same frequency, and wherein said base station includes buttons for selecting which of said plurality of wireless sensor nodes is selected to transmit.

5. A measurement system as recited in claim 3, wherein said base station transceivers are configured to receive data from a plurality of said wireless sensor nodes simultaneously.

6. A measurement system as recited in claim 3, wherein each one of said base station transceivers receives data from a corresponding wireless sensor node with a deterministic latency.

7. A measurement system as recited in claim 3, wherein each said wireless sensor node transceiver and each said base station transceiver includes software programmable tuning so each wireless sensor node transceiver and each corresponding base station transceiver can be programmed to operate on a distinct portion of the RF spectrum.

8. A measurement system as recited in claim 1, wherein each said wireless sensor node includes an address.

9. A measurement system as recited in claim 1, wherein said base station further includes an output for providing a signal indicating alarm status for one of said wireless sensor nodes.

10. A measurement system as recited in claim 1, wherein said base station further includes an output for providing a signal indicating battery status for one of said wireless sensor nodes.

11. A measurement system as recited in claim 1, further including a device, wherein one of said wireless sensor nodes is mounted on said device, wherein said base station is configured to provide a signal to said mounted wireless sensor node to control an operation of said device.

12. A measurement system as recited in claim 11, wherein said base station is configured to provide a signal to said mounted wireless sensor node to stop operation of said device to prevent damage to said device.

13. A measurement system as recited in claim 12, wherein said base station is configured to provide a signal to said mounted wireless sensor node to activate a kill switch.

14. A measurement system as recited in claim 1, wherein said base station further comprises a programmable filter in line with said first analog output.

15. A measurement system as recited in claim 1, wherein said output signal from said second output includes a measure of at least one from the group consisting of signal strength and error rate.

16. A measurement system as recited in claim 1, wherein said output signal from said second output includes a weighted average of at least one from the group consisting of signal strength and error rate.

17. A measurement system as recited in claim 1, wherein said output signal from said second output is capable of being processed by an analog data acquisition system.

18. A measurement system as recited in claim 1, wherein said second output is connected to an LED.

19. A measurement system as recited in claim 18, wherein brightness of said LED depends on error rate.

20. A measurement system as recited in claim 1, further comprising a plurality of said first analog outputs and a plurality of corresponding second outputs, wherein each said first analog output corresponds to a sensor, wherein said error-related output signal at each said second output indicates whether an error was present in said received digital signal for a corresponding first analog output and for a corresponding sensor.

21. A measurement system as recited in claim 1, wherein said base station further comprises a base station antenna, wherein said base station antenna is capable of receiving data transmitted at several frequencies at once.

22. A measurement system as recited in claim 1, wherein each said wireless sensor node includes a processor, wherein each said processor includes a program to turn off power to said wireless sensor node transmitter and to provide said processor in sleep state.

23. A measurement system as recited in claim 1, wherein each said wireless sensor node further includes an A/D converter, wherein said A/D converter converts analog data from said at least one sensor to said digital data derived from said at least one sensor.

24. A measurement system as recited in claim 1, wherein said base station further comprises a plurality of analog outputs that provide a plurality of analog output signals, wherein said plurality of analog output signals are derived from corresponding sensors.

25. A measurement system as recited in claim 22, wherein said base station further comprises a plurality of said second outputs, wherein said plurality of second outputs provide output signals, wherein said output signals each indicate whether an error was present in said received digital signal for a corresponding sensor.

26. A measurement system as recited in claim 1, further comprising an analog data acquisition system, wherein said first analog output is connected to said analog data acquisition system.

27. A measurement system as recited in claim 1, further comprising an oscilloscope, wherein said first analog output is connected to said oscilloscope.

28. A measurement system as recited in claim 1, wherein said base station further comprises a BNC connector, wherein said first analog output includes said BNC connector.

29. A measurement system, comprising a base station configured to receive wirelessly transmitted digital data and to provide at least one received digital signal derived from said wirelessly transmitted digital data, wherein said base station includes:
  a processor configured to analyze said at least one received digital signal for detecting an error;
  digital to analog circuitry configured for converting said at least one received digital signal into at least one received analog signal;
  a first analog output connected to provide an analog output signal derived from said at least one received analog signal; and
  a second output connected to provide a signal indicating presence of an error in said wirelessly transmitted digital data.

30. A measurement system as recited in claim 29, wherein said base station further comprises a plurality of base station transceivers wherein each one of said plurality of said base station transceivers is configured to receive at a different frequency from others of said plurality of said base station transceivers.

31. A measurement system as recited in claim 30, wherein said base station transceivers are configured to receive data at said different frequencies simultaneously.

32. A measurement system as recited in claim 30, wherein each one of said base station transceivers receives data with a deterministic latency.

33. A measurement system as recited in claim 30, wherein said base station includes software programmable tuning so each of said base station transceivers can be programmed to operate on a distinct portion of the RF spectrum.

34. A measurement system as recited in claim 29, wherein said base station includes a transceiver and buttons, wherein said buttons are for selecting which of a plurality of wireless transmissions will be received by said transceiver.

35. A measurement system as recited in claim 29, wherein said base station further includes an output for providing a signal indicating alarm status for a device transmitting to said base station.

36. A measurement system as recited in claim 29, wherein said base station further includes an output for providing a signal indicating battery status for a device transmitting to said base station.

37. A measurement system as recited in claim 29, further including a device, wherein one of said wireless sensor nodes is mounted on said device, wherein said base station is configured to provide a signal to said mounted wireless sensor node to control an operation of said device.

38. A measurement system as recited in claim 37, wherein said base station is configured to provide a signal to said mounted wireless sensor node to stop operation of said device to prevent damage to said device.

39. A measurement system as recited in claim 38, wherein said base station is configured to provide a signal to said mounted wireless sensor node to activate a kill switch.

40. A measurement system as recited in claim 29, wherein said base station further comprises a programmable filter in line with said first analog output.

41. A measurement system as recited in claim 29, wherein said output signal from said second output includes a measure of at least one from the group consisting of signal strength and error rate.

42. A measurement system as recited in claim 29, wherein said output signal from said second output includes a weighted average of at least one from the group consisting of signal strength and error rate.

43. A measurement system as recited in claim 29, further comprising a plurality of sensors and a plurality of said first analog outputs, wherein said plurality of first analog outputs provide a plurality of analog output signals, wherein each of said analog output signals is derived from a corresponding sensor.

44. A measurement system as recited in claim 43, further comprising a plurality of second outputs, wherein said plurality of second outputs provide output signals, wherein said output signals each indicate whether an error was present in said received digital signal for a corresponding sensor.

45. A measurement system as recited in claim 44, wherein said error-related output signal at each said second output indicates whether an error was present in said received digital signal for a corresponding first analog output and for a corresponding sensor.

46. A measurement system as recited in claim 29, wherein said output signal from said second output is capable of being processed by an analog data acquisition system.

47. A measurement system as recited in claim 46, wherein brightness of said LED depends on error rate.

48. A measurement system as recited in claim 29, wherein said second output is connected to an LED.

49. A measurement system as recited in claim 29, wherein said base station further comprises a base station antenna, wherein said base station antenna is capable of receiving data transmitted at several frequencies at once.

50. A measurement system as recited in claim 29, wherein said base station is configured to communicate using an address, and wherein said base station receives said wirelessly transmitted digital data based on said address.

51. A measurement system as recited in claim 29, further comprising an analog data acquisition system, wherein said first analog output is connected to said analog data acquisition system.

52. A measurement system as recited in claim 29, further comprising an oscilloscope, wherein said first analog output is connected to said oscilloscope.

53. A measurement system as recited in claim 29, wherein said base station further comprises a BNC connector, wherein said first analog output includes said BNC connector.

* * * * *